United States Patent

Boehning et al.

Patent Number: 5,173,468
Date of Patent: Dec. 22, 1992

[54] COMPOSITIONS OF THE FORMULA $MO_{12}P_aV_bX^1_cX^2_dX^3_eSB_fRE_gS_hO_n$

[75] Inventors: Karl-Heinz Boehning; Gerd Duembgen, both of Ludwigshafen; Ulrich Hammon, Karlsruhe; Richard Krabetz, Kirchheim; Franz Merger, Frankenthal; Matthias Schwarzmann, Limburgerhof; Fritz Thiessen; Herbert Vogel, both of Ludwigshafen, all of Fed. Rep. of Germany

[73] Assignee: BASF Aktiengesellschaft, Ludwigshafen, Fed. Rep. of Germany

[21] Appl. No.: 729,169

[22] Filed: Jul. 12, 1991

[30] Foreign Application Priority Data

Jul. 12, 1990 [DE] Fed. Rep. of Germany ....... 4022212

[51] Int. Cl.$^5$ .................. B01J 27/18; B01J 27/19; B01J 27/198
[52] U.S. Cl. .................. 502/209; 502/202; 502/205; 502/286; 502/211; 502/212; 502/216; 502/218; 502/220; 502/300; 502/304; 502/311; 502/312; 502/317; 502/318; 502/324; 502/344; 502/345; 502/347; 502/353
[58] Field of Search ............... 502/209, 211, 220, 216, 502/304, 311, 312, 317, 318, 324, 344, 345, 347, 353, 300, 202, 205, 206, 212, 218

[56] References Cited

U.S. PATENT DOCUMENTS

| | | | |
|---|---|---|---|
| 3,180,678 | 12/1979 | Wada et al. | 502/209 |
| 4,042,533 | 8/1977 | Shaw et al. | 502/209 |
| 4,101,448 | 7/1978 | Shaw et al. | 502/209 |
| 4,212,767 | 7/1980 | Daniel | 502/211 |
| 4,745,217 | 5/1988 | Matsumoto et al. | 502/209 |
| 4,925,980 | 5/1990 | Matsumoto et al. | 502/209 |
| 5,102,846 | 4/1992 | Kuroda et al. | 502/205 |
| 5,102,847 | 4/1982 | Yamamoto et al. | 502/209 |
| 5,104,844 | 4/1992 | Yamamoto et al. | 502/200 |

FOREIGN PATENT DOCUMENTS

| | | | |
|---|---|---|---|
| 0051348 | 5/1982 | European Pat. Off. | 502/209 |
| 0102688 | 3/1984 | European Pat. Off. | 502/209 |
| 0253896 | 1/1988 | European Pat. Off. | 502/209 |
| 265733 | 5/1988 | European Pat. Off. | 502/209 |

Primary Examiner—Anthony McFarlane
Attorney, Agent, or Firm—Oblon, Spivak, McClelland, Maier & Neustadt

[57] ABSTRACT

Compositions of the formula I $$MO_{12}P_aV_bX^1_cX^2_dX^3_eSb_fRe_gS_hO_n \qquad (I)$$

where
 $X^1$ is potassium, rubidium and/or cesium,
 $X^2$ is copper and/or silver,
 $X^3$ is cerium, boron, zirconium, manganese and/or bismuth,
 a is from 0.5 to 3.0,
 b is from 0.01 to 3.0,
 c is from 0.2 to 3.0,
 d is from 0.01 to 2.0,
 e is from 0 to 2.0,
 f is from 0.01 to 2.0,
 g is from 0 to 1.0,
 h is from 0.001 to 0.5 and
 n is a number determined by the valency and content of the elements different from oxygen in I, are used as catalysts for preparing methacrylic acid by gas-phase oxidation of methacrolein.

5 Claims, No Drawings

COMPOSITIONS OF THE FORMULA $Mo_{12}P_aV_bX^1{}_cX^2{}_dX^3{}_eSb_fRe_gS_hO_n$

The present invention relates to compositions of the formula I $$Mo_{12}P_aV_bX^1{}_cX^2{}_dX^3{}_eSb_fRe_gS_hO_n \qquad (I),$$

where $X^1$ is potassium, rubidium and/or cesium,
$X^2$ is copper and/or silver,
$X^3$ is cerium, boron, zirconium, manganese and/or bismuth,
a is from 0.5 to 3.0
b is from 0.01 to 3.0
c is from 0.2 to 3.0
d is from 0.01 to 2.0
e is from 0 to 2.0
f is from 0.01 to 2.0
g is from 0 to 1.0
h is from 0.001 to 0.5 and
n is a number determined by the valency and content of
the elements different from oxygen in I.

The present invention also relates to the process for preparing compositions of the formula I and to the use thereof as catalysts for preparing methacrylic acid by catalytic gas-phase oxidation of methacrolein.

EP-A 265 733 relates to compositions of the formula II $$Mo_{12}P_{a'}V_{b'}X^4{}_{c'}Cu_{d'}X^5{}_{e'}X^6{}_{f'}Zn_{g'}X^7{}_{h'}O_{n'} \qquad (II),$$

where $X^4$ is potassium, rubidium, cesium and/or thallium,
$X^5$ is cerium, boron, zirconium, manganese, bismuth, tungsten, magnesium, chromium, tin, tantalum and/or cadmium,
$X^6$ is antimony and/or iron,
$X^7$ is sulfur, silicon, selenium, scandium and/or gallium,
a' is from 0.1 to 3,
b' is from 0.01 to 3,
c' is from 0.01 to 3,
d' is from 0.01 to 3,
e' is from 0 to 5,
f' is from 0.1 to 5,
g' is from 0.01 to 3,
h' is from 0.001 to 5 and
n' is a number determined by the valency and content of the elements different from oxygen in II.

EP-A 51 348 relates to compositions of the formula III $$Mo_{12}P_{a''}V_{b''}X^8{}_{c''}Xu_{d''}X^9{}_5{}''X^{10}{}_{h''}O_{n''} \qquad (III),$$

where $X^8$ is potassium, rubidium and/or cesium,
$X^9$ is silver, barium, lanthanum, gallium, aluminum, cadmium, titanium, tantalum, mercury, lead and/or zinc,
$X^{10}$ is sulfur, manganese, iron, cobalt, nickel, strontium, indium, tantalum, germanium and/or beryllium,
a'' is from 0.1 to 3.0,
b'' is from 0.1 to 2.0,
c'' is from 0.1 to 3.0,
d'' is from 0.1 to 2.0,
g'' is from 0.01 to 2.0,
h'' is from 0 to 2.0 and
n'' is a number determined by the valency and content of
the elements different from oxygen in III.

Compositions (II) and (III) are recommended, inter alia, as catalysts for preparing methacrylic acid by catalytic gas-phase oxidation of methacrolein. However, the disadvantage of these compositions (II) and (III) is that when they are used as catalysts for preparing methacrylic acid by catalytic gas-phase oxidation of methacrolein the selectivity in which the methacrolein is converted into methacrylic acid is not entirely satisfactory.

EP-B 102 688 relates to compositions which are likewise suitable as catalysts for preparing methacrylic acid by oxidation of methacrolein. However, the disadvantage of these compositions is that they require in every case the presence of the toxic element arsenic.

It is an object of the present invention to provide compositions which are suitable, in particular, as catalysts for preparing methacrylic acid by gas-phase oxidation of methacrolein and which, when used, convert methacrolein into methacrylic acid with increased selectivity and, moreover, have reduced toxicity. We have found that this object is achieved by compositions of the formula I. Preferred compositions I are those where h is from 0.03 to 0.5 and/or g is different from 0, preferably 0.04 to 1. The novel compositions I can be obtained in a conventional manner. They can be prepared, for example, by finely dispersing suitable salts of the elements constituting them in aqueous medium by dissolving or suspending, if necessary at elevated temperature and with addition of acids or bases, mixing, evaporating the mixture to dryness, shaping the resulting composition and calcining it, as a rule at from 180 to 480° C., preferably 350 to 450° C., in a stream of air or in an inert atmosphere, eg. $N_2$ or $CO_2$. The novel compositions are expediently prepared in this form for use as unsupported catalysts, the preferred geometry of which is a hollow cylinder with an external diameter and a length of from 4 to 10 mm and a wall thickness of from 1 to 3 mm. The calcination can be carried out in several stages at different temperatures and/or under different atmospheres. Thus, for example, the first stage can be at from 200 to 260° C. under air, the second can be at from 420 to 460° C. under nitrogen and the third can be at from 350 to 410° C. again under air. The forms in which the elements are employed in the mode of preparation described are antimony normally as antimony trioxide, rhenium for example as rhenium(VII) oxide, molybdenum preferably as ammonium salt of molybdic or phosphomolybdic acid, boron for example as boric acid, vanadium usually as ammonium vanadate or vanadium oxalate, phosphorus advantageously as ortho-phosphoric acid or diammonium phosphate, sulfur for example as ammonium sulfate, and the cationic metals normally as nitrates, oxides, hydroxides, carbonates, chlorides, formates, oxalates or acetates or the hydrates thereof. It is possible to add to the aqueous mixture of the starting materials from 1 to 20 % by weight, based on the calcined catalyst composition, of organic compounds such as nitrogen-containing cyclic compounds, eg. pyridine, or else carboxylic acids or alcohols. The drying is normally carried out at from 60 to 180° C., and the dried composition can be shaped by conventional processes such as tabletting and extrusion, it being possible to add lubricants such as graphite or stearic acid and shaping aids and reinforcements such as microfilaments of glass, asbestos, silicon carbide or potassium titanate.

However, the novel compositions can also be used in the form of coated catalysts, ie. applied to a preshaped carrier material, for preparing methacrylic acid by gas-phase oxidation of methacrolein, in which case the composition can be applied to the carrier material for example in the form of the initial aqueous solution or suspension, followed by drying and calcination, or in the form of the calcined powder in combination with a binder. It is, of course, also possible for the novel compositions to be employed in the form of powders as catalysts.

The catalytic gas-phase oxidation of methacrolein to methacrylic acid using the novel catalysts is carried out in a conventional manner. The oxygen for the oxidation can be employed either in pure form or, for example, in the form of air. The large heat of reaction means that the reactants are preferably diluted with inert gas such as $N_2$ and/or with steam. The methacrolein : oxygen steam inert gas ratio is preferably 1 : 1-3 : 2-20 : 3-30, particularly preferably 1 : 1-3 : 3-10 : 7-18. The methacrolein can have been obtained in a variety of ways, eg. by gas-phase oxidation of isobutylene or tert-butanol. It is advantageous to employ methacrolein obtainable by condensation of propanol with formaldehyde in the presence of secondary amines and acids in liquid phase by the processes described in DE-C 875 114 or DE-B 2 855 514. The gas-phase oxidation can be carried out both in fluidized bed and in fixed bed reactors. It is preferably carried out in multiple tube reactors whose tubes contain the fixed catalyst composition, preferably in the form of cylindrical particles. The reaction is normally carried out at from 250 to 350° C, usually under from 1 to 3 bar with a preferred total space velocity of from 800 to 1,800 l (STP)/l/h. The methacrolein conversion under these conditions with a single pass through the reactor is normally from 50 to 80 mol %. The specified conditions are preferably mutually adjusted within the specified range so that there is a methacrolein conversion of from 60 to 70 mol % on a single pass through the reactor. Use of the novel compositions as catalysts in the described catalytic gas-phase reaction results in an increased selectivity of methacrylic acid formation even when the methacrolein space velocity exceeds 60 l(STP)/l/h. It is interesting that the novel compositions retain this property, as well as their activity, over lengthy periods of use, which reflects a remarkable insensitivity of the novel compositions, eg. to changes in pressure, temperature and concentration. However, the described process yields not pure methacrylic acid but a gas mixture which, besides methacrylic acid, usually contains minor components such as acetic, maleic, fumaric, citraconic, acrylic and formic acids, and the corresponding aldehydes and ketones, as well as unreacted methacrolein and inert gas, from which it is subsequently necessary to remove the methacrylic acid. This can be carried out in a conventional manner, eg. by scrubbing the reactor offgases after indirect and/or direct cooling at from 40 to 80° C. with water, resulting in an aqueous solution of methacrylic acid which still contains small amounts of the minor components and from which the methacrylic acid is normally removed by extraction with an organic solvent and separated from the latter by distillation. The conversion, selectivity and holdup time are defined as follows:

Methacrolein conversion $C$ (%) =

$$\frac{\text{number of moles of methacrolein reacted}}{\text{number of moles of methacrolein empolyed}} \times 100$$

Selectivity of product $K$ (%) =

$$\frac{\text{number of moles of methacrolein converted into } K}{\text{total number of moles of methacrolein converted}} \times 100$$

Holdup time (sec) =

$$\frac{\text{void volume of reactor packed with catalyst (l)}}{\text{synthesis gas throughput (l(STP)/h)}} \times 3,600$$

EXAMPLES a) Preparation of novel compositions B and comparative compositions C B1:
  i) 530 g of ammonium heptamolybdate tetrahydrate which contains 0.03 mole of potassium per mole of molybdenum, 29.3 g of ammonium metavanadate, 95 g of cesium nitrate, 106.5 g of 45 % by weight aqueous ortho-phosphoric acid, 31.1 g of 35 % by weight aqueous ammonium sulfate solution and 36.5 g of antimony trioxide were stirred into 600 g of water at 50° C.
  ii) This aqueous mixture was then heated to 95° C, a solution of 2.4 g of rhenium(VII) oxide and 30.2 g of copper(II) nitrate trihydrate was added and the mixture was evaporated to dryness at the same temperature. The resulting composition was then shaped into hollow cylinders with an external diameter of 7 mm, a length of 6 mm and an internal diameter of 3 mm, which were calcined at 380° C. in a stream of air for 5 h. X-ray diffraction diagrams obtained from powders of the resulting cylinders using the Cu $K_\alpha$ emission had maxima at $2\theta = 10.5°$ ,21.3° , 26.2° (main maximum) and 30.3° , which can be assigned to the cesium salt of phosphomolybdatovanadato-heteropolyacid.

B2 to B15 and C1 to C6: These catalysts were prepared in a corresponding manner to B1, and their molecular formulae are shown in Table 1, without specifying the number of oxygens. In these preparations, zinc was introduced as zinc nitrate hexahydrate, bismuth as bismuth(III) nitrate pentahydrate, boron as boric acid, silver, manganese, rubidium and additional potassium as nitrates, cerium as an equimolar (based on cerium) mixture of cerium nitrate and cerium oxide and zirconium as oxide in the amounts corresponding to the stoichiometry of the molecular formulae in Table 1 into the aqueous mixture, with zinc, bismuth, silver and manganese being stirred in stage ii) and the other elements in stage i).

b) The selectivity S of methacrylic acid formation when compositions B1 to B15 and C1 to C6 from a) are used as gas-phase catalysts.

For this comparison, the hollow cylinders from a) were powdered (arithmetic mean particle diameter 1 to 2 mm) and packed into tube reactors (10 mm internal diameter, 100 g of catalyst, cooling with salt bath) through which a gas mixture composed of 5% by vol. methacrolein,
9% by vol. oxygen,
25% by vol. steam and
61% by vol. nitrogen was passed at from 270 to 308° C. with an average holdup time of 3 sec and a methacrolein loading of 0.11 g/g/h (the data in % by vol. are based on l(STP)).

The resulting gases were cooled to 40° C. and washed successively with water and 50% by weight aqueous acetic acid. The washings were then analyzed by gas chromatography and polarography, and the selectivity of methacrylic acid formation was calculated from the results, which are shown in Table 1.

TABLE 1

| Composition | Stoichiometry | | | | | | | | | Temp (°C.) | C (%) | S (%) |
|---|---|---|---|---|---|---|---|---|---|---|---|---|
| B1 | $Mo_{12}$ $P_2$ | $V_1$ | $Cs_2$ | $K_{0.03}$ | $Cu_{0.5}$ | $Sb_1$ | $S_{0.03}$ | $Re_{0.04}$ | | 291 | 61.1 | 86.8 |
| B2 | $Mo_{12}$ $P_2$ | $V_1$ | $Cs_2$ | $K_{0.03}$ | $Cu_{0.5}$ | $Sb_1$ | $S_{0.03}$ | | | 290 | 61.9 | 86.3 |
| C1 | $Mo_{12}$ $P_2$ | $V_1$ | $Cs_2$ | $K_{0.03}$ | $Cu_{0.5}$ | $Sb_1$ | $S_{0.03}$ | $Zn_{0.3}$ | | 295 | 62 | 85.9 |
| C2 | $Mo_{12}$ $P_2$ | $V_1$ | $Cs_2$ | $K_{0.03}$ | $Cu_{0.5}$ | $Sb_1$ | | | | 292 | 60.9 | 84.2 |
| C3 | $Mo_{12}$ $P_2$ | $V_1$ | $Cs_2$ | $K_{0.03}$ | $Cu_{0.5}$ | | $S_{0.03}$ | | | 281 | 61.8 | 81.5 |
| B3 | $Mo_{12}$ $P_{1.5}$ | $V_{0.6}$ | $Cs_1$ | $K_{0.03}$ | $Cu_{0.5}$ | $Sb_1$ | $S_{0.03}$ | $Re_{0.04}$ | | 303 | 61.8 | 89.1 |
| B4 | $Mo_{12}$ $P_{1.5}$ | $V_{0.6}$ | $Cs_1$ | $K_{0.03}$ | $Cu_{0.5}$ | $Sb_1$ | $S_{0.03}$ | | | 291 | 62.3 | 88.7 |
| C4 | $Mo_{12}$ $P_{1.5}$ | $V_{0.6}$ | $Cs_1$ | $K_{0.03}$ | $Cu_{0.5}$ | $Sb_1$ | $S_{0.03}$ | $Zn_{0.3}$ | | 308 | 61.4 | 85.9 |
| C5 | $Mo_{12}$ $P_{1.5}$ | $V_{0.6}$ | $Cs_1$ | $K_{0.03}$ | $Cu_{0.5}$ | $Sb_1$ | | | | 298 | 62.5 | 85.1 |
| C6 | $Mo_{12}$ $P_{1.5}$ | $V_{0.6}$ | $Cs_1$ | $K_{0.03}$ | $Cu_{0.5}$ | | $S_{0.03}$ | | | 288 | 62.1 | 82.5 |
| B5 | $Mo_{12}$ $P_{1.8}$ | $V_{0.8}$ | $Cs_1$ | $K_{0.03}$ | $Cu_{0.5}$ | $Sb_1$ | $S_{0.03}$ | $Re_{0.04}$ | | 292 | 62.4 | 87.8 |
| B6 | $Mo_{12}$ $P_{1.3}$ | $V_{0.4}$ | $Cs_1$ | $K_{0.03}$ | $Cu_{0.5}$ | $Sb_1$ | $S_{0.03}$ | $Re_{0.04}$ | | 300 | 61.5 | 86.8 |
| B7 | $Mo_{12}$ $P_{1.3}$ | $V_{0.4}$ | $Cs_1$ | $K_{0.03}$ | $Cu_{0.5}$ | $Sb_{0.8}$ | $S_{0.03}$ | $Re_{0.04}$ | | 274 | 62.0 | 86.7 |
| B8 | $Mo_{12}$ $P_{1.3}$ | $V_{0.4}$ | $Cs_1$ | $K_{0.03}$ | $Cu_{0.5}$ | $Sb_{0.5}$ | $S_{0.03}$ | $Re_{0.04}$ | | 270 | 61.8 | 87.3 |
| B9 | $Mo_{12}$ $P_{1.3}$ | $V_{0.4}$ | $Cs_1$ | $K_{0.03}$ | $Cu_{0.5}$ | $Sb_{1.3}$ | $Re_{0.04}$ | | | 285 | 62.1 | 87.1 |
| B10 | $Mo_{12}$ $P_{1.3}$ | $V_{0.4}$ | $Cs_1$ | $K_{0.03}$ | $Cu_{0.5}$ | $Sb_1$ | $S_{0.03}$ | $Re_{0.05}$ | $Ag_{0.1}$ | 302 | 62.0 | 86.9 |
| B11 | $Mo_{12}$ $P_{1.5}$ | $V_{0.6}$ | $Cs_1$ | $K_{0.03}$ | $Cu_{0.5}$ | $Sb_1$ | $S_{0.03}$ | $Re_{0.04}$ | $Ce_{0.2}$ | 287 | 62.5 | 86.8 |
| B12 | $Mo_{12}$ $P_{1.5}$ | $V_{0.6}$ | $Cs_1$ | $K_{0.03}$ | $Cu_{0.5}$ | $Sb_1$ | $S_{0.03}$ | $Mn_{0.1}$ | | 300 | 61.1 | 88.8 |
| B13 | $Mo_{12}$ $P_{1.5}$ | $V_{0.6}$ | $Cs_{0.8}$ | $K_{0.03}$ | $Cu_{0.5}$ | $Sb_1$ | $S_{0.03}$ | $Rb_{0.2}$ | $Mn_{0.1}$ $Bi_{0.05}$ | 286 | 62.1 | 88.8 |
| B14 | $Mo_{12}$ $P_{1.5}$ | $V_{0.6}$ | $Cs_1$ | $K_{0.03}$ | $Cu_{0.5}$ | $Sb_1$ | $S_{0.03}$ | $B_{0.1}$ | | 285 | 62.3 | 88.9 |
| B15 | $Mo_{12}$ $P_{1.5}$ | $V_{0.6}$ | $Cs_1$ | $K_{0.03}$ | $Cu_{0.5}$ | $Sb_1$ | $S_{0.03}$ | $ZR_{0.1}$ | | 282 | 61.8 | 88.7 | c) Selectivity S of methacrylic acid formation as a function of the time when novel compositions from a) are used c1) A tube reactor (steel tube, 26 mm diameter, salt bath cooling) was packed with 1 liter of catalyst B3 (hollow cylinders) and, at about 290° C., a gas mixture composed of 5% by vol. methacrolein,
10% by vol. oxygen,
25% by vol. steam,
1.2% by vol. CO,
4% by vol. $CO_2$ and
0.3% by vol. methanol was passed through with a methacrolein loading of 110 g/l/h (the data in % by vol. are based on 1 (STP)). The components CO, $CO_2$ and methanol simulate the minor components which are normally present in practice as a consequence of recycling unreacted methacrolein. The reaction temperature was changed as a function of the operating times so that the methacrolein conversion was maintained at 60% on a single pass. S was 85.7% after operation for 120 hours (291° C.), 88.3% after 1,800 hours (286° C.) and 87.9% after 3,600 hours (287° C.). c2) As c1 but the catalyst B4 was employed in place of B3. S was 86.1% after 120 hours 289° C.) and 89.5% after 1,728 hours (283° C.).

We claim:

1. A composition of the formula I

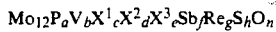

$$Mo_{12}P_a V_b X^1_c X^2_d X^3_e Sb_f Re_g S_h O_n \qquad (I),$$

where $X^1$ is potassium, rubidium and/or cesium,
$X^2$ is copper and/or silver,
$X^3$ is cerium, boron, zirconium, manganese and/or bismuth,
a is from 0.5 to 3.0,
b is from 0.01 to 3.0,
c is from 0.2 to 3.0,
d is from 0.01 to 2.0,
e is from 0 to 2.0,
f is from 0.01 to 2.0,
g is from 0 to 1.0,
h is from 0.001 to 0.5 and
n is a number determined by the valency and content of the elements different from oxygen in I.

2. A composition as claimed in claim 1, where h is from 0.03 to 0.5

3. A composition as claimed in claim 1, where g is from 0.04 to 1.

4. A composition as claimed in claim 1, where h is from 0.03 to 0.5 and g is from 0.04 to 1.

5. A process for preparing a composition of the Formula I

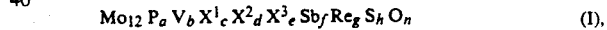

$$Mo_{12} P_a V_b X^1_c X^2_d X^3_e Sb_f Re_g S_h O_n \qquad (I),$$

where $X^1$ is potassium, rubidium and/or cesium,
$X^2$ is copper and/or silver,
$X^3$ is cerium, boron, zirconium, manganese and/or bismuth,
a is from 0.5 to 3.0,
b is from 0.01 to 3.0,
c is from 0.2 to 3.0,
d is from 0.01 to 2.0,
e is from 0 to 2.0,
f is from 0.01 to 2.0,
g is from 0 to 1.0,
h is from 0.001 to 0.5 and
n is a number determined by the valency and content of the elements different from oxygen in I, comprising, mixing finely dispersed salts of the defined elements in defined proportions in an aqueous medium evaporating the mixture to dryness, shaping the resulting composition and calcining it a from 180° to 480° C.